3,342,264
A METHOD OF REMOVING SOLID PARAFFIN-CONTAINING DEPOSITS FROM OIL WELL SURFACES AND COMPOSITIONS THEREFOR
John W. Willard, Sr., Rapid City, S. Dak., assignor to J. B. Oil Treatment Company, Incorporated, a corporation of South Dakota
No Drawing. Filed Aug. 12, 1965, Ser. No. 479,276
9 Claims. (Cl. 166—38)

ABSTRACT OF THE DISCLOSURE

Solid paraffin-containing deposits on surfaces in oil wells are removed by introducing a treating composition containing lecithin into the interior of the well and into intimate contact with the deposit, introducing an aqueous solution of alkali into the well, and thereafter flushing the well with water. In another varient, the well is treated with a composition which preferably contains a water soluble alkali metal silicate, a miscelle-forming rosin acid soap, a partially saponified triglyceride vegetable oil, a triglyceride vegetable oil, alkali, a hydrocarbon solvent, a cyclic alcohol, lecithin and an alkaline earth metal silicate.

---

This application is a continuation-in-part of application Serial No. 332,859, filed December 23, 1963, now abandoned in the name of John W. Willard, Sr.

The present invention relates to methods of cleaning oil wells and oil wells that also produce gas. The invention is concerned not only with the cleaning of the metallic surfaces within the wells, but also the cleaning of the adjacent producing formations and the flow lines from the well to the storage tanks. The invention is also concerned with a novel cleaning composition that is especially useful for removing solid hydrocarbon-containing deposits from surfaces, a process for preparing the novel cleaning composition, and a process for cleaning surfaces with the composition.

In addition to the desired oil, or gas and oil, producing formations also yield to a well certain quantities of undesired materials. Among these are paraffins, asphaltic and waxy materials, and silt, sand, gums, minerals, salts and hydrates and other materials. These undesired materials are a great source of trouble in wells because they tend to clog the producing formation and reduce or shut off the flow of the well.

In the past, the problem of removing paraffin deposits from pumping wells and flow lines has been attacked in a number of ways. The oldest method, which was perhaps the most effective method heretofore, was to clean the well mechanically, e.g., by scraping. But this method resulted in lost production time and high labor costs and required special tools, all of which was often too expensive to be economically feasible.

It has also been a common practice to try to restore the flow of a well by cleaning the well with chemical solvents. In order to do this, hot oil or solvent have been introduced in liquid phase into the well in an effort to dissolve the undesired materials. In actuality, however, the solvents used in the prior art have been effective only to dissolve the paraffins and other hydrocarbons that are readily soluble in organic media. Moreover, the use of such solvents has been a time-consuming and costly operation and has resulted in considerable loss of production time. But perhaps worst of all, the prior art methods of cleaning wells by the use of solvents such as hot oil or other solvents have been largely ineffective and in many instances have served only to worsen the fouling of the well. This is because when the praffin and other relatively readily soluble constituents of the sludge are removed by solvent, the proportion of insoluble soil-like constituents of the sludge rises, with the result that the sludge becomes even denser and less permeable by gas and oil.

Accordingly, it is an object of the present invention to provide methods for cleaning wells and producing formations, characterized in that the constituents of the fouling sludge are removed.

Another object of the present invention is the provision of methods for cleaning wells and producing formations, characterized in that redeposition of sludge following cleaning is greatly inhibited.

Still another object of the present invention is the provision of methods for cleaning wells and producing formations which can be performed in only a small fraction of the time previously consumed by cleaning operations.

It is also an object of the present invention to provide methods for cleaning oil wells and producing formations, which will cost only a fraction of the cost of methods heretofore practiced for the same purpose.

It is a further object of the present invention to provide methods for cleaning oil wells and producing formations, which will be relatively simple and easy to practice with uniformly desirable results.

It is a further object to provide a novel, highly effective cleaning composition for removing solid hydrocarbon-containing deposits from surfaces by the method of the invention.

It is a further object to provide a process for preparing the novel cleaning composition of the invention.

Other objects and advantages of the present invention will become apparent from a consideration of the following description.

In accordance with one important variant, the present invention comprises removing sludge from oil wells or producing formations or flow lines by contacting the sludge with polyol esters of fatty acids, and thereafter contacting the sludge with an aqueous solution of alkali metal hydroxide, after which the well can be flushed with water.

In preferred embodiments of the invention, an alkali metal silicate is also present in the cleaning composition, as is also a finely divided precipitate of polyvalent metal silicate, preferably divalent, more preferably Group II elements having atomic numbers from 12–56, e.g., magnesium, calcium, zinc, strontium, cadmium or barium, and most preferably selected from the class consisting of calcium and magnesium silicates. Also in the preferred embodiments, the liquids are applied to the well at elevated temperature. It is also preferred that the polyol be a glyceride. In certain preferred embodiments, lecithin is also present in the cleaning composition. It is further preferred that the ester be dissolved in a solvent comprising at least principally aliphatic hydrocarbons having 10–12 carbon atoms. Another preferred relationship is that the ester be only a partial ester.

As a result of operation according to any or all of the preferred forms of the invention, the ester penetrates and at least partially dissolves the paraffin of the sludge, whereupon the subsequent treatment with alkali metal hydroxide at least partially saponifies the esters to form water soluble alkali metal soaps which complete the cleaning action, whereupon flushing with water removes the whole of the sludge, leaving clean surfaces. When lecithin is used, the polar portion of the lecithin molecule migrates to the iron surfaces, and upon hydrolysis, the lecithin in effect swells and causes the scale to break from the iron surfaces, after which the phosphatid moiety remains on the iron surfaces to inhibit further redeposition. When polyvalent metal silicates are used, much the same result is obtained, the polyvalent metal silicate again adhering to the iron surfaces to inhibit renewed buildup of sludge. In addition, the alkali metal silicates remove grease and peptize agglomerates and thus remove solid dirt.

In greater detail, the preferred forms of the invention are set forth as follows:

Ester

The esters of the present invention comprise esters of fatty acids and polyols. The fatty acid has 12–24 carbons in the chain and may be saturated or unsaturated. The preferred chain length is 16–18 carbons, and particularly preferred is 18 carbons, e.g., stearic, oleic, linoleic, linolenic. The polyols have 2–6 carbon atoms, e.g., glycols, glycerols, sorbitols, etc. Particularly preferred are the glycerols.

A particularly preferred group of esters are the vegetable oils, e.g., corn oil, soy bean oil, safflower seed oil, cotton seed oil, flax seed oil, peanut oil, linseed oil, etc. These vegetable oils are largely triglycerides, and the fatty acid moiety is largely oleic, linoleic and linolenic.

It is also preferred to modify the esters of the present invention to regulate their hydrophile-lyophile balance. This is preferably done by partial de-esterification of the polyol, for example, by partial saponification with an alkaline earth metal hydroxide such as calcium hydroxide, to increase the proportion of mono- and di-esters.

Ester solvent

In order to increase the surface area of the ester and regulate viscosity, the ester is applied to the well and its associated producing formation in a solvent, preferably a hydrocarbon, and more preferably primarily aliphatic hydrocarbons having 10–12 carbon atoms. When a solvent of such characteristics is employed, the cleaning action is greatly augmented. This is quite unexpected, for it would of course be assumed that the shorter the hydrocarbon chain the greater the solvent power and the greater the cleaning action. In fact, however, the preferred solvents are considerably more effective than hydrocarbons of shorter chain length such as the principal gasoline hydrocarbons.

In some instances, the medium of the cleaning agent will be entirely organic. In other cases, the organic medium will be dispersed in water preferably in the form of an emulsion. In general, the higher the proportion of paraffin the other organic-soluble components of the sludge, the greater will be the organic phase of the cleaning composition; while the higher the proportion of soil-like components of the sludge the greater will be the aqueous phase of the cleaning composition.

Lecithin

Commercial lecithin is a mixture of the diglycerides of stearic, palmitic and oleic acids, linked to the choline ester of phosphoric acid. Structurally, it appears as follows:

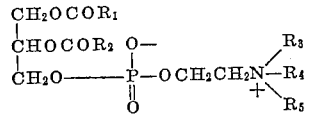

in which $R_1$ and $R_2$ are hydrocarbon chains having 15–21 carbons and more than 50% 17 carbons, and $R_3$, $R_4$ and $R_5$ are lower alkyl, e.g., methyl, ethyl, propyl or butyl, preferably methyl.

It will be seen that one portion of the molecule is lyophilic, while the other portion is polar and hence is attracted to the metal surfaces within the well. The paraffin will be penetrated by the organic phase of the cleaning composition with the result that the lecithin can migrate readily to the metal surface. Upon subsequent treatment with alkali metal hydroxide and then water, the lecithin on the metal surface has the effect of dislodging scale at the surface, so that the scale breaks off in relatively large chunks that have the imprint of the bare metal surface on them. It may be that the saponification of hydrolysis of the lecithin causes the scale to break away, but it seems more probable that the scale-breaking action of the lecithin occurs as a result of swelling in water or the formation of a water-in-solid colloid, for the scale-breaking action of the lecithin is observed upon flushing with water rather than upon prior treatment with alkali metal hydroxide. The bare metal surface remains with at least the phosphate portion of the lecithin molecule adhered thereto, thereby to retard further scale or sludge formation on the metal surfaces.

Silicates

It is preferred to use substantial quantities of alkali metal silicates in the cleaning composition, preferably sodium silicate. These silicates remove large quantities of grease and also peptize agglomerates and thus removes solid dirt. In other words, the silicates help wet out individual dirt particles and cause the fine dirt particles to repel each other and remain in suspension until flushed away, and also emulsify the oil and grease present in the sludge. In addition, solutions of water-soluble silicates have high specific heats and good heat transfer properties and hence conduce to the rapid transfer of heat to the well structure and producing formation.

It has also been found that the cleaning action of the present invention is greatly enhanced by the presence of small but effective amounts of polyvalent metal silicates, preferably divalent, preferably silicates of Group II metals having atomic numbers between 12–56, e.g., magnesium, calcium, zinc, strontium, cadmium and barium. Particularly preferred are magnesium and calcium. These polyvalent metal silicates can be formed in situ by contact between polyvalent metal salts dissolved in water and sodium silicate. If the water is "hard" to begin with and contains substantial proportions of calcium and magnesium ions, then it is necessary only to add the sodium silicate to the water, whereupon sufficient calcium and magnesium silicate will form. Otherwise, it is desirable to add water-soluble polyvalent metal salts to water prior to addition of alkali metal silicates to the water, and prior to addition of the esters.

Therefore, it is preferred to prepare the cleaning composition of the present invention in two steps: (1) the polyvalent metal silicate is formed either with hard water or with the addition of polyvalent metal salts to water and the reaction with alkali metal silicate, whereupon a finely divided colloidally suspended precipitate of the polyvalent metal silicate is formed; and (2) thereafter, an aqueous emulsion with the ester and ester solvent and other ingredients of the cleaning composition is formed.

When the composition of the present invention is inserted into a well to clean the well, the polyvalent metal silicates are strongly attracted to the iron surfaces. After removal of the sludge, they remain behind on the iron surfaces and inhibit subsequent deposition on the surfaces thus protected.

Other ingredients

Various other ingredients may also be used in order to promote the cleaning action of the present invention. Among these are a solution of sodium abietate or sodium resinate in a solvent such as cyclohexanol or methylcyclohexanol. This resinate emulsifies the oil and grease present in the sludge, acts as a solvent for solid carbonaceous product and forms some methyl cyclohexanol abietate which has good solvent and dispersing properties. Sodium resinate also renders the silicates compatible with the alkaline earth metal salts and lecithin solution if used. Sodium salts of fatty acids also can be used for this purpose. Other useful ingredients are cold process laundry soap, soda ash, and other detergent or cleansing agents.

Temperature

The use of heat with the process of the present invention varies with the type of sludge and the method of treatment. When an aqueous emulsion is used in contact with a sludge in which the paraffin is dispersed in small particles throughout the sludge, a temperature below the melting point of the paraffin is desirable so as to prevent the formation of a continuous organic phase in the slurry. On the other hand, when a non-aqueous organic cleansing agent is used, then the higher the temperature the better up to the limitations imposed by the boiling points of the various fluids. Also, when using an aqueous emulsion, it is of course desirable to operate below the boiling point of water, preferably around 200° F. On the other hand, use of heat is not altogether necessary and in many instances it is possible to operate at ambient temperature.

Alkali

After the cleaning composition has been in contact with the well and producing formation for a suitable period of time, an alkali metal hydroxide is placed in contact with the cleaner-saturated paraffin deposit of the well. The alkali metal hydroxide is preferably either sodium or potassium, and sodium is preferred. It is introduced in aqueous solution. Preferably, it is introduced hot.

It is not necessary that the alkali metal hydroxide be introduced into the well as such. It is possible to form it in situ, as by the use of the carbonates or silicates or bicarbonates or phosphates, which upon hydrolysis produce the hydroxide.

The alkali metal hydroxide, applied hot to the previously treated sludge, partially saponifies the fatty acid glycerides or other esters and lecithin if any. In addition, this saponification introduces heat into the well because the saponification is exotherimc. The resulting sodium salts are water-soluble soaps that act as dispersing and emulsifying agents.

Procedure

As is well known, an oil well ordinarily comprises a vertical cylindrical casing in contact with the producing formation and multi-perforate adjacent its lower end to permit the entry of oil from the producing formation into an annular space between the casing and concentric internal tubing. A standing valve is disposed adjacent the lower end of the tubing and a traveling valve is vertically reciprocated by rods that are also concentric within the tubing and casing. At the upper end of the assembly, the casing has a casing head and the tubing has a stuffing box within which the rods slidably reciprocate. Oil forced upwardly in the tubing by the traveling valve leaves the upper end of the tubing through a flow line. The casing head is also provided with conduits for the exit of casing head gas and liquids from the upper end of the casing and also for the introduction of liquids into the casing.

Also, ordinarily available in oil fields are trucks that are equipped to treat oil wells. These trucks carry tanks for transporting liquids and a furnace to heat the liquid. The trucks also ordinarily carry two pumps, operated from a power take-off from the truck drive, one pump being a low pressure pump and the other a high pressure pump. There is thus ordinarily equipment available for practicing the process of the present invention.

After a sample of the sludge that fouls the well has been obtained and tested to determine its composition and therefore the best cleaning procedure, the necessary liquids may be withdrawn as needed from the truck. If the well is not so badly fouled that the pump can still operate, and also the sludge contains a high percentage of inorganic matter, then the pump can be positioned so that both the traveling valve and the standing valve are open. Pressure in the casing and the tubing are thus equalized. A quantity of boiling water can then be pumped into the tubing to displace the petroleum from the sludge area and to preheat the sludge. The hot water is left in contact with the sludge for a period of time that depends on the thickness of paraffin accumulation and the bottom hole temperature of the well. The higher the temperature the shorter the contact time that is required.

The appropriate cleaning composition can then be pumped into the tubing. The cleaner is heavier than the previously introduced water and will displace the water and contact the fouled portion of the interior of the well. Depending upon the hydrostatic pressure in the formation, the displaced water will either rise in the casing or discharge into the formation.

After the cleaner has been in contact with the sludge for an appropriate time, the caustic solution can be heated and pumped into the tubing, thereby forcing the cleaning solution ahead of it into the casing. After the caustic solution has been in contact with the sludge for an appropriate time, hot water such as boiling water can be pumped into the tubing to flush the well and can be left in contact with the sludge for an appropriate time. The pump is then started and the water, with some caustic and cleaner, is pumped out of the well. This mixture can either be discharged into the flow line or recycled into the casing, as desired.

One characteristic feature of operation according to the present invention is that not only does the flow promptly increase, but also it continues to increase over a protracted period of time after the treatment has been completed. Apparently, this is because the cleaning solution and the caustic solution are heavier than the oil and continue to penetrate the producing formation after treatment of the well has been completed, with the result that the well cleansing action of the present invention is still further augmented.

If the pump is plugged, then the first effort must be to open the pump and allow the passage of fluid. A petroleum naphtha and water are admixed to form an emulsion that is heated and pumped into the tubing and boiling water is pumped into the casing. The hot water causes the tubing to expand and also loosens the sludge. When the pump is again operative, the previously described cleaning cycle can be followed.

If the sludge is mainly paraffin or is of the asphaltic paraffin type, then the initial treatment with hot water is not used. Instead, the removal of hydrocarbonaceous material is effected with solvent which has a substantially higher boiling point than water and therefore can be heated to a substantially higher temperature than water.

If the well has a high bottom oil pressure, then after the last or flushing step with hot water, oil from a storage tank at the well site will be pumped into the tubing using the high pressure pump on the truck to exert the necessary pressure to force the cleaning ingredients into the formation.

When there is indication that the pay face of the formation has been partially plugged, it may also be necessary to wait a period of time such as a week after cleaning the well and then repeat the cleaning operation.

The above described cleaning composition and method are highly effective for the removal of solid hydrocarbon-containing deposits from oil wells, pumping equipment, flow lines and metallic or other surfaces in general. However, the method does require the further step of contacting the ester-treated surface from which the deposit is to be removed with an aqueous solution of an alkali. It would therefore be desirable to eliminate the alkali treatment and provide a method in which only one solution need be employed.

It has been further discovered that the treatment with the aqueous alkali may be eliminated by using the special cleaning composition of the invention. The composition may contain a water soluble metal silicate, a water soluble micelle-forming soap such as an alkali metal rosin soap, and the partially saponified ester of a fatty acid and a polyol. Preferably, the composition also contains a vegetable oil such as corn oil, and/or a water soluble compound providing an alkaline reaction such as alkali metal hydrorides and carbonates, and/or a hydrocarbon solvent. An alcohol may be present, and preferably a cyclic alcohol such as cyclohexanol or methylcyclohexanol.

For best results, the cleaning composition should also contain an alkaline earth metal silicate, and/or a partially saponified product resulting from the reaction of an ester of a fatty acid and a polyol with an alkaline earth metal hydroxide, and/or lecithin. This combination of ingredients, in addition to those previously recited, seems to have a synergistic effect and a cleaning composition is produced which has unique cleaning ability even at low temperatures and at short contact periods.

The ingredients in the composition may be prepared in accordance with the teachings appearing hereinbefore. However, better results are obtained when the composition is prepared by the preferred procedure of the invention and when employing the preferred ingredients.

For best results, the cleaning composition should be prepared from the ingredients listed below:

| Substance | Broad Range | Preferred Amount |
| --- | --- | --- |
| Alkali metal rosin soap (lbs.) | 2–3 | 2.2 |
| Alkali metal metasilicate pentahydrate (lbs.) | 6–10 | 8 |
| Refined vegetable oil or corn oil (lbs.) | 2–3 | 2.2 |
| Alkali metal hydroxide (lbs.) | 2–4 | 2 |
| Vegetable oil or corn oil slurry (10 parts of corn oil partially saponified with one part of alkaline earth metal hydroxide in 4 parts of water, by weight) (lbs.) | 6–10 | 8.6 |
| Lecithin concentrate containing 65% soy bean phosphatides and 35% soy bean oil (lbs.) | 1–3 | 2 |
| Petroleum naphtha, containing largely aliphatic hydrocarbons having 10–12 carbon atoms (gals.) | 3–6 | 4.7 |
| Cyclohexanol or methylcyclohexanol (lbs.) | 2–6 | 4.4 |
| Magnesium sulfate heptahydrate (grams) | 20–100 | 21 |
| Calcium chloride (anhydrous) (grams) | 10–50 | 10.5 |
| Water (gals.) | 6–10 | 8 |

It is understood that chemical equivalents of the above substances may be substituted when desired, including those mentioned hereinbefore. Anhydrous substances may be substituted for the hydrated substances, and vice versa, in equivalent amounts. Suitable organic solvents for the rosin soap may be substituted for the methylcyclohexanol or cyclohexanol, or hydrocarbon solvents in general for the petroleum naphtha. Additionally, other satisfactory water soluble alkaline earth metal salts may be substituted for the magnesium sulfate or calcium chloride mentioned above. Sodium or potassium hydroxide, metasilicate and rosin soap are usually preferred. The water should be present in an amount to provide an aqueous medium for reaction of the above ingredients and have an initial temperature of at least 60° C. and the cyclohexanol or methylcyclohexanol should be present in an amount sufficient to dissolve the rosin soap. The petroleum naphtha should be present in an amount to provide a hydrocarbon medium for the lecithin concentrate.

When preparing the cleaning composition of the invention, preferably the above ingredients are placed in a reaction vessel provided with heating and stirring means, and then heated with stirring at a temperature of at least 80° C., and preferably at 90–100° C. The heating may continue until the ingredients, upon cooling, will set to a pasty mass, which is usually yellow in color. There is a definite reaction which takes place during this heating step, and this reaction is essential in producing the universal cleaning composition of the invention. Shorter heating periods are required at higher temperatures within the above range, and longer periods at the lower temperatures. However, usually a heating period of about ½–2 hours is sufficient, although longer or shorter periods often may be used when desired provided the reaction noted above occurs. Also, temperatures higher than 100° C. may be employed in instances where the reaction vessel is under pressure.

The universal cleaning composition concentrate prepared as described above is preferably diluted with an aqueous medium such as water. For best results, approximately one volume of the concentrate should be added to four volumes of hot water in the field immediately prior to adding the cleaning composition to the oil well tubing or casing. The temperature of the water should be at least 175° and, for best results, about 200–212° F. The aqueous medium containing the concentrate may be added to the oil well tubing or casing as described hereinbefore.

It is not necessary to follow the cleaning solution treatment with an alkali solution treatment; however, this may be done if desired. The cleaning solution is very effective, and usually contact with the sludge for 10–15 minutes is sufficient to loosen it. Much longer contact periods may be employed, such as 1–3 to 1–12 hours, or longer as extended periods of contact do no harm. The cleaning solution treatment is preferably followed by a water flush.

Experimental evidence indicates that the hot, dilute aqueous cleaning solution is altered when it comes in contact with the sludge and oil in the well, and the properties of the solution change drastically. The altered cleaning solution resulting from this contact has been found to be very effective in dispersing and removing the sludge at temperatures as low as 65–70° F., or even lower. Thus, the universal cleaning solution of the invention is unique in that when the hot solution comes in contact with a certain type of sludge, and the oil from which the sludge was liberated, a different and even more effective cleaning solution seems to be produced. This new cleaning solution will penetrate and disperse the sludge more rapidly and at a lower temperature than the original cleaning solution. The reason for these unusual and unexpected results is not fully known at the present time.

To enable those skilled in this art to practice the invention, the following illustrative examples are given:

EXAMPLE I

Thirteen pounds of hydrated sodium sesquisilicate is added to 45 gallons of water and the mixture is heated to 190° F. The water is "hard" and contains about 300 parts per million of calcium and magnesium ion. A finely divided colloidally suspended precipitate of calcium and magnesium silicate forms and lends a cloudy cast to the solution. To this hot liquid there is then added 39 pounds of a solution of one part by weight of sodium abietate-rosin in two parts by weight of methylcyclohexanol. Then, 39 pounds of a slurry is added that is obtained by the partial saponification of a commercial grade corn oil with calcium hydroxide in the ratio of one part by weight of calcium hydroxide to four parts by weight of water to ten parts by weight of corn oil. This slurry has previously been warmed until essentially all of the hydroxide has reacted. The slurry includes unreacted corn oil as well as partially saponified corn oil. Finally, 39 pounds of a solution is added which is lecithin concentrate in an amount of 10% by weight in a solvent. The lecithin concentrate is approximately 65% soy bean phosphatides and 35% soy bean oil and is sold commercially by the Archer-Daniel-Midland Company of Minneapolis, Minnesota under the brand name of "R-Lecin TS." The solvent is a petroleum naphtha having a boiling range of 355–410° F., and an A.P.I. gravity of 46.3 and a closed cup flash point of 141° F., comprising principally aliphatic hydrocarbon having 10–12 carbon atoms and sold by the Skelly Oil Company of Kansas City, Missouri, under the brand name of "Skellysolve-T."

One hundred gallons of boiling water is pumped into the tubing and left in contact with the sludge for 15 minutes. The suspension resulting from the admixture of these ingredients is then added, at a temperature of 190° F. After 25 minutes an equal volume of 10% sodium hydroxide solution at a temperature of 190° F. is pumped into the tubing and into contact with the previously treated sludge. After another 25 minutes, 300 gallons of boiling water are pumped into the tubing and left to stand 20 minutes. The pump is then operated and most of the water and caustic and cleaning solution and sludge is removed from the well. Pieces of scale from adjacent the ferrous surfaces in the well bear the imprint of the surfaces, indicating that the ferrous surfaces are clean and exposed.

EXAMPLE II

A cleaning composition is made up with comprises 9 pounds of a commercial cold process laundry soap having moisture and volatile ingredients about 36%, anhydrous material both organic and inorganic about 65%, and free caustic 0.10%; 13.5 pounds of melted rosin; 1.5 gallons of corn oil; 1.0 gallon of methylcyclohexanol; 0.5 gallon of 40% Be aqueous sodium silicate solution; 1.5 gallon of Stoddard solvent; and 5 pounds of sodium carbonate. The cold process soap is a mixture of coconut oil, castor oil and tallow saponified at a temperature below 80° C. using caustic soda. The laundry soap is dissolved in 6 gallons of 200° F. water. A solution of 13.5 pounds of rosin is dissolved in one gallon of methylcyclohexanol and then heated to 200° F. and added with stirring to the soap solution. The corn oil is then added with stirring, followed by the sodium silicate solution and the Stoddard solvent and finally the sodium carbonate is dissolved in the mixture. To apply this cleaning composition to the well, 35 gallons of the cleaning composition and 35 gallons of water are mixed together and heated to 200° F. and introduced into the space between the polish rod and the walls of the tubing under pressure of 350 p.s.i. The solution remains in contact with the pump in the well until the well is no longer fouled, as evidenced by the fact that the pump works freely. Next, 35 gallons of a 2% by weight sodium hydroxide aqueous solution is heated to 200° F. and added to the casing through the annulus. Otherwise, the method of Example I is followed.

EXAMPLE III

Example I is repeated, except that soft water is used containing no measurable quantity of polyvalent metal ion, that is, no calcium or magnesium.

EXAMPLE IV

Example I is repeated, except that the solution of lecithin is omitted.

EXAMPLE V

Example I is repeated, except that in place of the cleaning composition applied in the first step of Example I, there is used 49 gallons of the naphtha of Example I containing dissolved in it 3 pounds of the lecithin concentrate of Example I.

EXAMPLE VI

Example I is repeated, except that in place of the cleaning composition applied in the first step of Example I, there is used a solution of 5 gallons of corn oil in 45 gallons of the naphtha of Example I.

In all of these examples, various degrees of good cleaning not only of the paraffin but also of the soil-type constituents of the sludge from the well and the producing formation is observed. In addition, in the case of all examples except Examples II and VI, a substantial retardation of the re-deposition rate of sludge and scale is also observed.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

EXAMPLE VII

This example illustrates the preparation and use of the improved cleaning composition of the present invention which does not require a treatment with an aqueous solution of alkali.

The following ingredients were placed in a reactor provided with heating coils and a stirrer:

8 gallons of water having a temperature of 60° C.
21 grams of magnesium sulfate heptahydrate
10.5 grams of calcium chloride (anhydrous)
8.0 lbs. of sodium metasilicate pentahydrate
2.0 lbs. of sodium hydroxide
6.6 lbs. of sodium rosinate in cyclohexanol solution (1 part by weight of sodium abietate-rosin in 2 parts by weight of cyclohexanol)
2.2 lbs. of refined corn oil
8.6 lbs. of a calcium corn oil slurry prepared as in Example I
2 lbs. of the lecithin concentrate employed in Example I
4.65 gallons of the petroleum naphtha employed in Example I In preparing the composition, the hot water was added to the reaction vessel, followed by the water soluble inorganic compounds, which resulted in a finely divided colloidally suspended precipitate of calcium silicate and magnesium silicate. To this hot solution or suspension was added with stirring the cyclohexanol solution of the rosin soap, followed by the refined corn oil and calcium corn oil slurry. The calcium corn oil slurry was prepared as in Example I, i.e., by partial saponification of a commercial grade of corn oil with calcium hydroxide in a ratio of 1 part by weight of calcium hydroxide to 4 parts by weight of water to 10 parts by weight of corn oil. The slurry was warmed until essentially all of the calcium hydroxide had reacted, and included unreacted corn oil as well as partially saponified corn oil. Then, the lecithin concentrate was added in the form of a suspension in the petroleum naphtha.

The above mixture was heated with stirring at 90° C. and, when cooled, it formed a pasty yellow mass. Each volume of the cleaner concentrate thus prepared was diluted with 4 volumes of hot water heated to 200° F. and the resulting cleaning solution was used in removing sludge from an oil well.

The oil well was about 6,000 feet deep and had a 2½ inch tubing and a ¾ inch sucker rod, and contained about 20 barrels (42 gallons each) of oil in the tubing. The well was producing about 20 barrels of oil per day and extensive sludge deposits had formed on the surfaces in contact with the oil. Approximately 100 gallons of the cleaning solution was pumped into the tubing and left in contact with the sludge for about 3 hours. The well was then flushed with water.

The above treatment resulted in the removal of the sludge from the metal surfaces in the well. Additionally, the treatment had the further beneficial effect of removing sludge deposits from the pumping equipment, and the flow lines leading away from the well. In the latter instance, the treatment was at the ambient temperature and was far below the initial temperature of 200° F., such as 60–70° F. or even lower. The modified cleaning solution which was produced upon contact of the initial cleaning solution with the sludge and oil in the well, was effective for removing sludge even at the lower temperatures.

What is claimed is:

1. A method of removing paraffin-containing deposits on surfaces in oil wells comprising introducing lecithin into the interior of the well and into intimate contact with the said deposits, introducing an aqueous solution of alkali which contains sufficient alkali to saponify the lecithin into the interior of the well and into intimate contact with the said deposits, the alkali being selected from the group consisting of alkali metal hydroxides, carbonates, phosphates and silicates, and thereafter introducing water into the interior of the well and flushing the well therewith.

2. The method of claim 1 wherein the lecithin is in a hydrocarbon solvent.

3. The method of claim 1 wherein a polyvalent metal silicate is introduced into the interior of the well in the presence of the lecithin.

4. The method of claim 3 wherein the polyvalent metal silicate is selected from the group consisting of calcium silicate and magnesium silicate.

5. A method of preparing a cleaning composition comprising heating a mixture comprising about 2-3 pounds of a micelle-forming water soluble rosin acid soap, about 6-10 pounds of a water soluble alkali metal silicate, about 30-150 grams of a water soluble alkaline earth metal salt, about 1-3 pounds of lecithin, about 2-3 pounds of triglyceride vegetable oil, and about 2-4 pounds of an alkali selected from the group consisting of alkali metal hydroxides, carbonates and phosphates in an aqueous medium at an elevated temperature between about 80° C. and the boiling point until the mixture reacts and sets to a pasty mass upon cooling to normal room temperature.

6. The method of claim 5 wherein the mixture contains about 2-3 pounds of an alkali metal rosin soap as the micelle-forming soap, about 6-10 pounds of an alkali metal metasilicate, about 2-3 pounds of vegetable oil, about 2-4 pounds of alkali metal hydroxide, about 6-10 pounds of a vegetable oil partially saponified with an alkaline earth metal hydroxide, about 1-3 pounds of lecithin, about 3-6 gallons of a hydrocarbon solvent, about 2-6 pounds of an alcohol selected from the group consisting of cyclohexanol and methylcyclohexanol, about 20-100 grams of magnesium sulfate, about 10-50 grams of calcium chloride and about 6-10 gallons of water.

7. The cleaning composition prepared by the method of claim 5.

8. A method of removing solid paraffin-containing material deposited from crude petroleum on a surface in contact therewith comprising intimately contacting the deposit of the said solid paraffin-containing material with a cleaning composition prepared by the method of claim 5, and thereafter intimately contacting the deposit of the said solid paraffin-containing material with water.

9. A method of removing solid paraffin-containing material deposited from crude petroleum on a surface in contact therewith comprising intimately contacting the deposit of the said solid paraffin-containing material with a cleaning composition prepared by the method of claim 6, and thereafter intimately contacting the deposit of the said solid paraffin-containing material with water.

References Cited

UNITED STATES PATENTS

| 1,513,371 | 10/1924 | Campbell | 252—8.55 |
| 2,032,174 | 2/1936 | Johnson | 252—8.55 |
| 2,218,306 | 10/1940 | Austerman | 166—38 |
| 2,580,765 | 1/1952 | Hall et al. | 252—8.55 |
| 2,770,307 | 11/1956 | Deerdoff | 166—41 |
| 2,805,200 | 9/1957 | Lee et al. | 252—8.55 |
| 2,817,635 | 12/1957 | Goldman et al. | 252—8.55 |

FOREIGN PATENTS

| 1,293 | 1856 | Great Britain. |
| 2,959 | 1872 | Great Britain. |
| 516,218 | 12/1939 | Great Britain. |

LEON D. ROSDOL, *Primary Examiner.*

ALBERT T. MEYERS, H. B. GUYNN,
*Assistant Examiners.*